United States Patent
Boullosa Vazquez et al.

(10) Patent No.: US 7,438,312 B2
(45) Date of Patent: Oct. 21, 2008

(54) VEHICLE STEERING WHEEL WITH PIVOTING HORN

(75) Inventors: Javier Boullosa Vazquez, Pontevedra (ES); Jorge Ollero Ollero, Pontevedra (ES)

(73) Assignee: Alphi Metal Espana, S.A., Madrid (ES)

( * ) Notice: Subject to any disclaimer, the term of this patent is extended or adjusted under 35 U.S.C. 154(b) by 0 days.

(21) Appl. No.: 11/708,715

(22) Filed: Feb. 20, 2007

(65) Prior Publication Data
US 2007/0216143 A1  Sep. 20, 2007

(30) Foreign Application Priority Data
Mar. 13, 2006  (ES)  ................. 200600638

(51) Int. Cl.
*B60R 21/16* (2006.01)
(52) U.S. Cl. .............. 280/731; 200/61.54; 74/552
(58) Field of Classification Search .......... 280/731; 200/61.54, 61.55, 61.56; 74/552
See application file for complete search history.

(56) References Cited

U.S. PATENT DOCUMENTS

| | | | | |
|---|---|---|---|---|
| 5,333,897 A | * | 8/1994 | Landis et al. | 280/728.2 |
| 5,597,177 A | * | 1/1997 | Matsuura | 280/731 |
| 5,627,352 A | * | 5/1997 | Suzuki et al. | 200/61.54 |
| 6,098,494 A | * | 8/2000 | Kellogg et al. | 74/552 |
| 6,312,012 B1 | * | 11/2001 | Bohn et al. | 280/731 |
| 6,572,138 B1 | * | 6/2003 | Bohn et al. | 280/731 |
| 6,802,531 B2 | * | 10/2004 | Bohn et al. | 280/731 |
| 7,077,427 B2 | * | 7/2006 | Rhea | 280/731 |
| 2002/0113419 A1 | * | 8/2002 | Kai et al. | 280/731 |

* cited by examiner

*Primary Examiner*—Toan C To
(74) *Attorney, Agent, or Firm*—Ladas and Parry LLP

(57) ABSTRACT

The invention relates to a steering wheel (11) of an automotive vehicle including a framework (17), a foam filling (19) and a horn device (33) with an integrated airbag module (21) including an element (31) for actuating said horn device (33) once the airbag module (21) is positioned and fixed in the steering wheel (11) by pressing the cover (25) of the airbag module (21), and also including securing means for securing the cover (25) of the airbag module (21) in the foam filling (19) of the steering wheel (11) so that the airbag module (21) can pivot thereupon when the horn is actuated.

4 Claims, 2 Drawing Sheets

VEHICLE STEERING WHEEL WITH PIVOTING HORN

FIELD OF THE INVENTION

The present invention relates to a steering wheel of an automotive vehicle with an integrated airbag module and more particularly to a steering wheel of an automotive vehicle with an integrated airbag module in which the horn is actuated by pressing the cover of the airbag module.

BACKGROUND OF THE INVENTION

U.S. Pat. No. 6,086,090 describes a vehicle steering wheel with an airbag module integrated therein through seats provided with springs such that upon pressing the cover of the airbag module the electric circuit of the horn is closed since elements thereof located in the steering wheel and in the airbag module come into contact, and with means for fixing the airbag module in the steering wheel, including positioning elements to facilitate assembling the airbag module on the steering wheel.

U.S. Pat. No. 6,244,620 describes a vehicle steering wheel with an airbag module integrated therein through seats provided with springs such that upon pressing the cover of the airbag module the electric circuit of the horn is closed since elements thereof located in the steering wheel and in the airbag module come into contact, including positioning elements located in the lower part of the airbag module cooperating with holes located in the steering wheel to facilitate assembling the airbag module on the steering wheel.

U.S. Pat. No. 6,312,102 describes a vehicle steering wheel with an airbag module integrated therein through seats provided with springs such that upon pressing the cover of the airbag module the electric circuit of the horn is closed since elements thereof located in the steering wheel and in the airbag module come into contact, said seats including means for fixing and positioning the airbag module in the steering wheel.

Patent document WO 2004/005084 describes a vehicle steering wheel with an airbag module integrated therein through seats provided with springs such that upon pressing the cover of the airbag module the electric circuit of the horn is closed since elements thereof located in the steering wheel and in the airbag module come into contact, said seats including means for predetermining a certain gap between the airbag module and one of the components of said seats.

A drawback of the prior art is that the snap-fitting of the airbag module to the airbag module is done through intermediate parts.

The present invention is oriented to the solution of this drawback.

SUMMARY OF THE INVENTION

The steering wheel of an automotive vehicle coupled to the steering column of the vehicle with an integrated airbag module according to the present invention comprises:

- a steering wheel structured on the basis of a framework and a foam filling and including a horn device;
- an airbag module including an element for actuating said horn device;
- means of the means for positioning and fixing the airbag module in the steering wheel which allow actuating the horn device by pressing the cover of the airbag module;
- securing means for securing the cover of the airbag module in a point of the steering wheel so that the airbag module can pivot thereupon when it is pressed to actuate the horn device.

An important feature of the present invention is that said securing point is fixed which allows the direct snap-fitting of the cover of the airbag in the steering wheel without needing the intermediate parts used in steering wheels of the prior art with "floating" airbag modules.

Another important feature of the present invention is that the snap-fitting of the airbag module in the steering wheel takes place in the two seats where the means for positioning and fixing the airbag module (21) are arranged in the steering wheel and also in a third point located directly on the foam of the steering wheel, which simplifies the adjustment between the airbag module and the steering wheel and allows minimizing the gap between both.

Another important feature of the present invention is that the snap-fitting movement of the cover of the airbag module in the steering wheel is vertical, facilitating the assembly of the airbag module in the steering wheel.

Other features and advantages of the present invention will be disclosed in the following detailed description of an illustrative and in no case limiting embodiment of the object thereof in relation to the attached drawings.

DETAILED DESCRIPTION OF THE INVENTION

Figure 1:
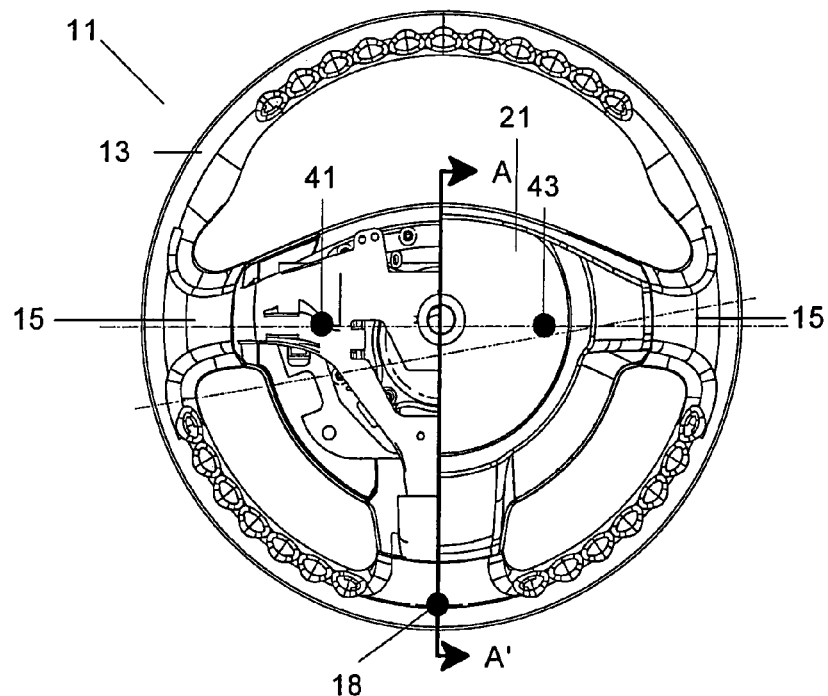
FIG. 1 shows a plan view of a steering wheel with an integrated airbag module according to the present invention.
Figure 2:
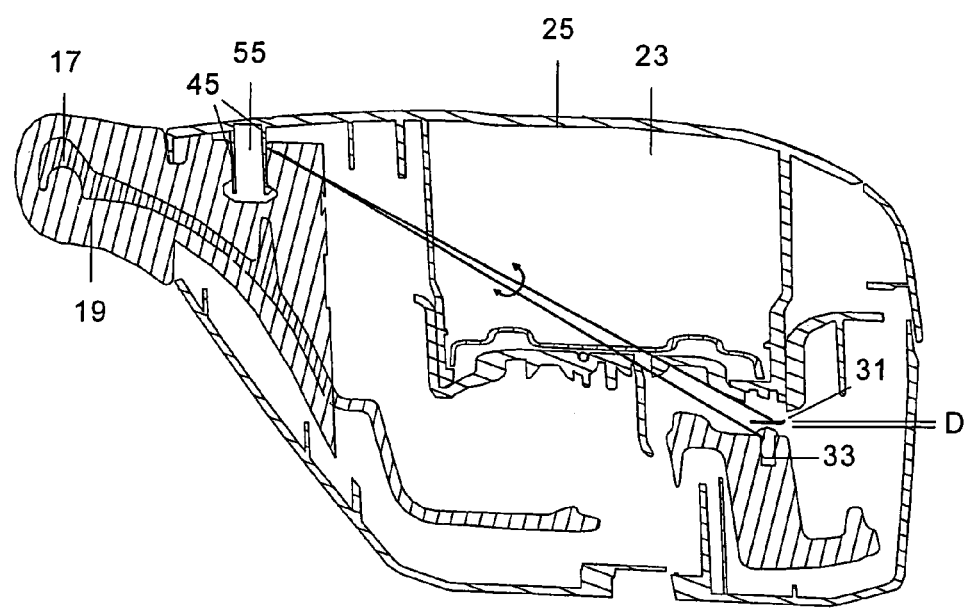
FIG. 2 shows a cross-sectional view of the steering wheel of FIG. 1 by line A-A' with the horn at rest.
Figure 3:
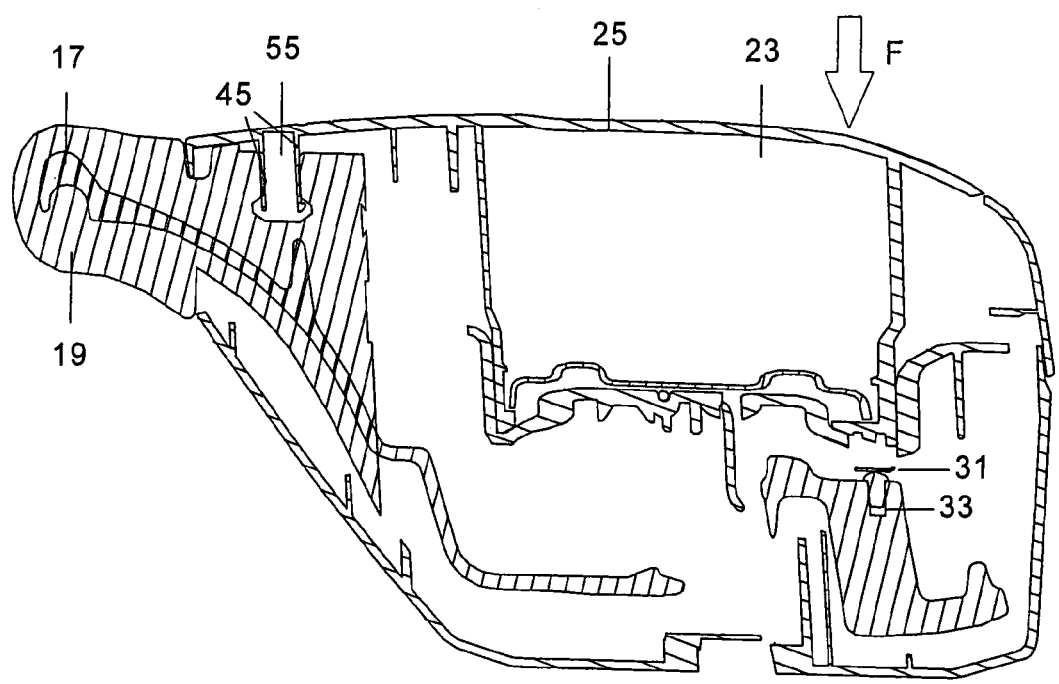
FIG. 3 is a cross-sectional view of the steering wheel of FIG. 1 by line A-A' with the horn in operation.

As is well known in the art, a steering wheel of an automotive vehicle is configured with a ring 13 and several radii 15 and is structured on the basis of a framework 17 and a foam filling 19 and integrates an airbag module 21 which for the purposes of this invention includes a body 23 and a cover 25.

The airbag module 21 is fixed to the steering wheel 11 in two seats 41, 43 with means (not shown) so that the plate 31 fixed to the airbag module 21 can come into contact with the horn device 33 fixed to the steering wheel 11, moving vertically the distance D when the cover 25 is pressed, and stops being in contact when the pressure on the cover 25 is withdrawn, recovering the initial position.

These means normally comprise springs allowing the return of the pulsation and the opening of the horn, but for the purposes of this invention, they can be carried out in any manner which allows carrying out the mentioned functions (fixing the airbag module in the steering wheel and actuating the horn).

According to the invention, the cover 25 of the airbag module 21 which can be made with rigid (PA, PC) or flexible (TPO) materials is snap-fit in the steering wheel 11 by means of a projection 45 which is introduced in a hole 55 in the foam filling 19 and the function of which is to both serve as a pivoting point of the airbag module 21 when the cover 25 is pressed to actuate the horn, and form a means for positioning the airbag module 21 during its assembly in the steering wheel 11.

The hole 55 is preferably located in a position 18 which would form a hypothetical isosceles triangle with the mentioned seats 41, 43.

The movement of the horn is given by the application of a force F on the cover 25, which moves the plate 31 making it come into contact with the horn device 33, closing the circuit activating it.

In this movement the projection 45 remains fixed acting as a pivot or rotation center of the airbag module 21.

The movement of the horn and the return to rest thereof is ensured by the springs included in the seats of the airbag module 21 in the steering wheel 11.

The positioning of the projection 45 is defined, in axis Z, by the support area 51 in the foam filling 18 of the part of the cover 25 located between the projection 45 and the final edge 53 and, in axes X and Y, by the relation between the dimensions of the hole 55 in the foam filling 19 and the dimensions of the projection 45 of the cover.

The projection 45 will end in a hook 49 preventing the snap-fitting removal of the airbag module 21 as it is retained by the lower widening 57 of the hole 55.

Figure 4:
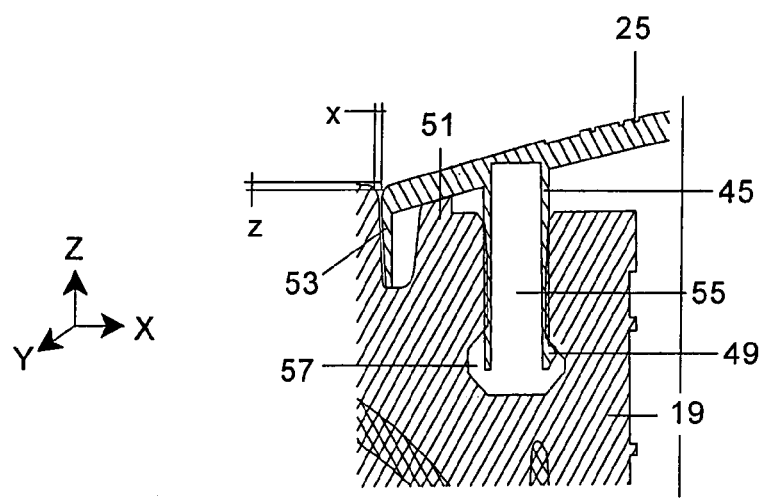
FIG. 4 is detailed sectional view of the area for securing the cover of the airbag module in the steering wheel.

As shown in FIG. 4, the mentioned configuration allows minimal gaps x, z between the airbag module 21 and the steering wheel 11.

Although several embodiments of the invention have been described and shown, it is evident that modifications comprised within the scope thereof can be introduced therein, and the latter must not be considered limited to said embodiments but to the contents of the following claims.

The invention claimed is:

1. In a steering wheel (11) of an automotive vehicle with an integrated airbag module (21), the steering wheel (11) comprising a framework (17), a foam filling (19) and a horn device (33) and the airbag module (21) comprising a cover (25) and an element (31) for actuating the horn device (33), the improvements comprising:

means for positioning and fixing the airbag module (21) in the steering wheel (11) for actuating the element (31) actuating the horn by pressing the cover (25); and securing means for fixing the cover (25) in the foam filling (19) so that the airbag module (21) pivots thereupon when the horn is actuated;

wherein said securing means consist of a projection (45) arranged in the cover (25) of the airbag module (21) and a hole (55) located in the foam filling (19) of the steering wheel (11) configured such that once the projection (45) is introduced in the hole (55), it is retained therein; and wherein the projection (45) includes a hook (49) at its lower part and the hole (55) includes a widening (57) at its end part so that said hook (49) is retained in the foam filling (19) of the steering wheel (11).

2. A steering wheel (11) of an automotive vehicle coupled to the steering column of the vehicle with an integrated airbag module (21) according to claim 1, wherein the means for positioning and fixing the airbag module (21) in the steering wheel (11) include two seats (42, 43) for supporting the airbag module (21) and wherein the securing of the cover (25) on the steering wheel (11) is located in a position (18) which would form a hypothetical isosceles triangle with said seats (42, 43).

3. A steering wheel (11) of an automotive vehicle coupled to the steering column of the vehicle with an integrated airbag module (21) according to claim 1, wherein the means for positioning and fixing the airbag module (21) in the steering wheel (11) include two seats (42, 43) for supporting the airbag module (21) and wherein the securing of the cover (25) on the steering wheel (11) is located in a position (18) which would form a hypothetical isosceles triangle with said seats (42, 43).

4. A steering wheel (11) of an automotive vehicle coupled to the steering column of the vehicle with an integrated airbag module (21) according to claim 1, wherein the means for positioning and fixing the airbag module (21) in the steering wheel (11) include two seats (42, 43) for supporting the airbag module (21) and wherein the securing of the cover (25) on the steering wheel (11) is located in a position (18) which would form a hypothetical isosceles triangle with said seats (42, 43).

* * * * *

UNITED STATES PATENT AND TRADEMARK OFFICE
CERTIFICATE OF CORRECTION

PATENT NO. : 7,438,312 B2 Page 1 of 1
APPLICATION NO. : 11/708715
DATED : October 21, 2008
INVENTOR(S) : Javier Boullosa Vazquez and Jorge Ollero Ollero It is certified that error appears in the above-identified patent and that said Letters Patent is hereby corrected as shown below:

On Title Page, Item 73, "ALPHI" should be -- DALPHI --.

Signed and Sealed this

Seventeenth Day of March, 2009

JOHN DOLL
*Acting Director of the United States Patent and Trademark Office*